A. FRODELL.
VALVE SPRING LIFTER.
APPLICATION FILED FEB. 11, 1919.
1,325,985.
Patented Dec. 23, 1919.
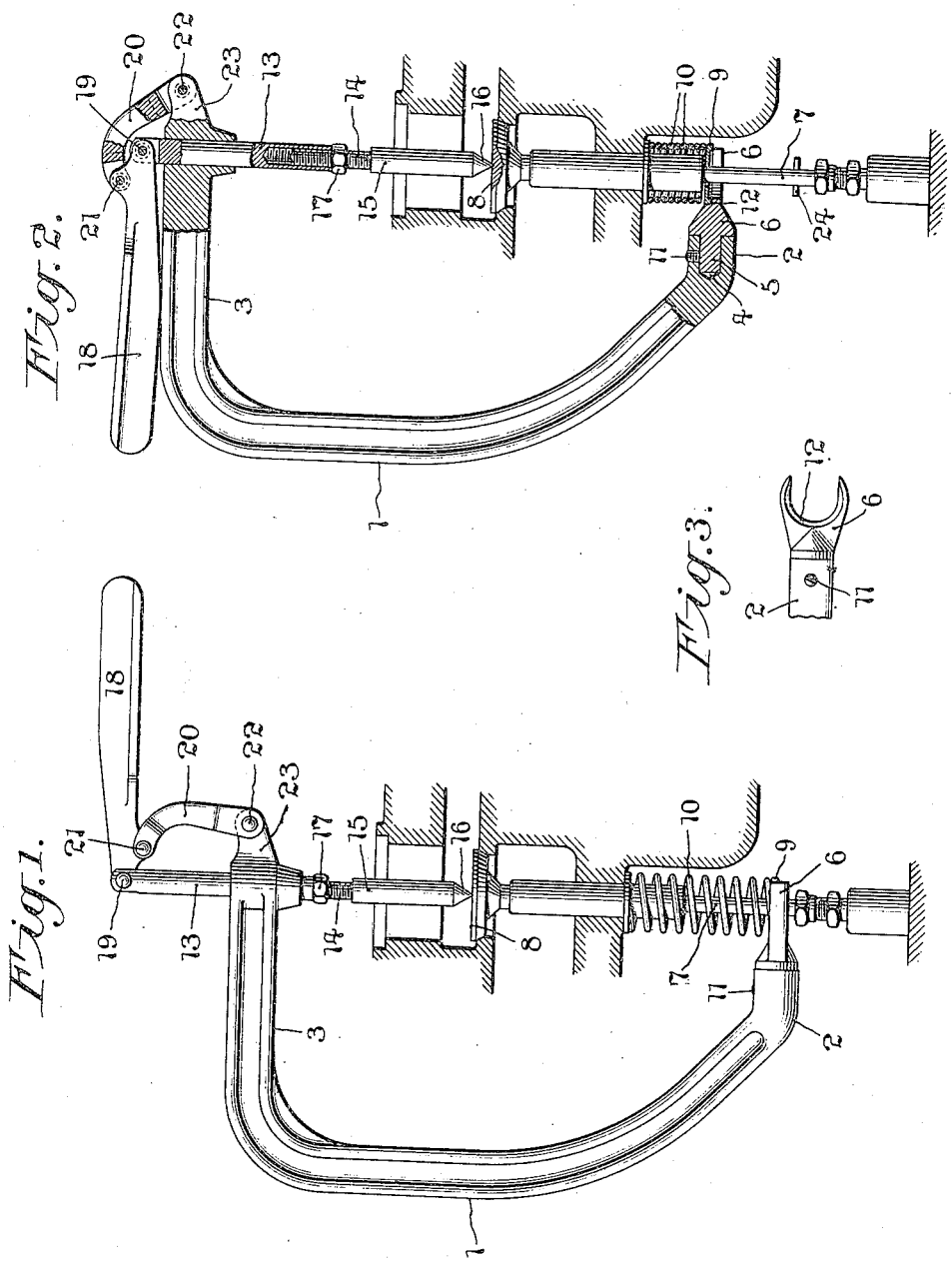
Inventor:
Axel Frodell
by attorneys
Brown & Seward

UNITED STATES PATENT OFFICE.

AXEL FRODELL, OF BROOKLYN, NEW YORK.

VALVE-SPRING LIFTER.

1,325,985. Specification of Letters Patent. Patented Dec. 23, 1919.

Application filed February 11, 1919. Serial No. 276,406.

*To all whom it may concern:*

Be it known that I, AXEL FRODELL, a citizen of the United States, and resident of the borough of Brooklyn, in the city and State of New York, have invented a new and useful Improvement in Valve-Spring Lifters, of which the following is a specification.

This invention relates to improvements in valve spring lifters particularly intended for use in connection with automobile engines and has for its object to provide a device which will compress the valve closing spring so that the valve spring cup may be lifted away from its retaining pin and the pin removed from the valve stem. After the pin has been removed the device may then be released and either the spring or the valve or both removed and replaced.

Another object is to provide a device having a removable yoke for engaging the valve spring cup.

Another object is to provide a device which may be adjusted to suit valve springs of various lengths and sizes of valve stems and valves.

Another object is to provide certain improvements in the form, construction and arrangement of the several parts whereby the above named and other objects may be effectively carried out.

A practical embodiment of my invention is represented in the accompanying drawings in which, Figure 1 represents a side elevation of my improved valve spring lifter as applied to one form of valve and spring, the adjacent parts of an internal combustion engine being shown in section.

Fig. 2 represents a similar view with the parts in the position they would assume when the valve spring has been lifted, and Fig. 3 represents a plan view of a portion of the bracket and the interchangeable yoke, which engages the valve spring cup.

The device is formed of a U-shaped bracket denoted by 1 having a lower arm 2 and an upper arm 3. The lower arm 2 is provided with a socket 4 which is arranged to receive the shank 5 of a yoke 6 which is adapted to straddle the valve stem 7 of the valve 8 and engage the valve spring cup 9 in which one end of the valve spring 10 rests. The shank 5 is held in the socket 4 by means of a set screw 11 which is threaded in the arm 2. This yoke 6 is recessed as shown at 12, to receive the valve spring cup 9, and I intend to provide a number of similar yokes having shanks adapted to fit the socket 4 in the arm 2, but having recesses the diameters of which will be varied so that the device may be adapted to valve spring cups of various diameters.

The upper arm 3 has a longitudinal sliding engagement with the upper member 13 of a valve engaging pin, the lower end of which member is exteriorly threaded to receive a screw threaded shank 14 of the lower member 15, the end of which is tapered at 16 and arranged to engage the valve 8. The lower member 15 may be adjusted longitudinally in the upper member 13 and locked in its adjusted position by a lock nut 17 which has threaded engagement with the shank and arranged to engage the upper member 13.

A handle 18 is fulcrumed at 19 to the upper member 13 and connected with the upper arm 3 through a link 20, one end of which is pivoted at 21 to the handle 18 and the other end hinged at 22 to an ear 23 extending laterally from the upper arm 3.

The operation of the device is as follows:

When it is desired to remove the valve from its operative position in the engine, the device is first placed in the position shown in Fig. 1, with the handle 18 thrown to the right and the bracket 1 with its arm 2 lowered to the position where the yoke is in line with the valve spring cup. The yoke 6, being chosen to correspond to the diameter of the valve spring cup, is arranged to straddle the valve stem 7 and seat the valve spring cup. The lower member 15 of the pin is next longitudinally adjusted, in the upper member 13 by means of the screw threaded shank 14 until the tapered end 16 engages the valve 8, after which the lock nut 17 is forced against the upper member 13 to lock the lower member 15 against unintentional displacement.

After the parts have been located and adjusted to the desired requirement, the handle 18 may then be thrown over to the left, to the position shown in Fig. 2, during which movement the distance between the tapered end 16 of the lower member 15 of the pin and the yoke 6 has been decreased so that the spring has been compressed to a position clear of the pin 24 in the valve stem. In this position the pin 24 may be removed and the handle 9 thrown to the right, whence the parts will again assume their normal position. The device may now be removed by swinging the bracket with its yoke 6 outwardly from beneath the valve spring cup, whereupon the spring will expand until its inertia is diminished or exhausted and the valve and its stem free to be withdrawn.

This movement of the handle accomplishes the following result:—Since the valve is held on its seat by the spring, the point of contact of the pin and valve may be considered a stationary point, and it is obvious that the pivot 19 will become the fulcrum about which the handle will swing. Upon the movement of the handle the pivot 21 carried by the handle will describe an arc over the pivot 19 and as the link 20 is connected to the ear 23 on the upper arm by the pivot 22, it will move the bracket upwardly with the link and handle, thereby causing the bracket with its lower arm 2 and yoke 5 to move upwardly toward the pin and thus compress the spring. It will be seen on Fig. 2 of the drawing, that the pivot 21 will be carried past a vertical central line drawn through the pin so that the parts are locked in this position, and any movement or retroaction of the spring could not displace any of the parts. With the device supported in this position the operator is free to manipulate the valve and its adjacent mechanisms.

It will be understood that various changes may be resorted to in the form, construction and arrangement of the several parts without departing from the spirit and scope of my invention, and hence I do not intend to be limited to the details herein shown and described except as they may be included in the claims.

What I claim is:—

1. A valve spring lifter comprising a bracket having upper and lower arms, a valve engaging pin slidably mounted in said upper arm and arranged to be shortened and lengthened, a handle fulcrumed on said pin and linked to said bracket, and a yoke removably mounted in said lower arm for engaging the spring.

2. A valve spring lifter comprising a bracket having upper and lower arms, a valve engaging pin having an upper member slidably mounted in said upper arm, and a lower member having a threaded engagement with said upper member to provide longitudinal adjustment therein, a handle fulcrumed on the upper member and linked to said bracket, and a yoke in said lower arm for engaging the spring.

3. A valve spring lifter comprising a bracket having upper and lower arms, a valve engaging pin having an upper member slidably mounted in said upper arm, and a lower member longitudinally adjustable in said upper member, a handle fulcrumed on the upper member and linked to said bracket, and a yoke removably mounted in said lower arm for engaging the spring.

4. A valve spring lifter comprising a bracket having upper and lower arms, a valve engaging pin having an upper member slidably mounted in said upper arm, and a lower member provided with a screw threaded shank, said shank having a threaded engagement with said upper member for adjusting the lower member longitudinally therein, a handle fulcrumed on the upper member and linked to said bracket, and a yoke removably mounted in said lower arm for engaging the spring.

In testimony that I claim the foregoing as my invention, I have signed my name this 27th day of January, 1919.

AXEL FRODELL.